United States Patent [19]

Mazurin et al.

[11] 4,380,532

[45] Apr. 19, 1983

[54] PROCESS FOR FINE PURIFICATION OF SULPHUR HEXAFLUORIDE FROM IMPURITIES

[76] Inventors: Igor M. Mazurin, Zeleny prospekt, 2/19, korpus 2, kv. 1; Mikhail L. Netupsky, ploschad Pobedy, 2, korpus 1, kv. 70; Alexandr V. Shevtsov, ulitsa Marshala Novikova, 16, kv. 37; Viktor T. Gladky, Chertanovskaya ulitsa, 51, korpus 2, kv. 123, all of Moscow; Nikolai A. Dmitriev, ulitsa Jubileinaya, 7, kv. 25, Zheleznodorozhny, Moskovskaya oblast; Andrei G. Lyapin, ulitsa Golubinskaya, 25, korpus 2, kv. 24, Moscow; Alexandr V. Polyakov, ulitsa Ussuriiskaya, 14, korpus 1, kv. 21, Moscow; Mikhail A. Myshev, ulitsa Deguninskaya, 13, korpus 1, kv. 149, Moscow; Vladimir V. Panov, Sredne-Kupavninsky proezd, 26, kv. 143, Moscow, all of U.S.S.R.

[21] Appl. No.: 279,484

[22] Filed: Jul. 1, 1981

[51] Int. Cl.³ .............................................. C01B 17/45
[52] U.S. Cl. ........................................ 423/469; 62/12; 62/18; 23/294 R; 23/295 R
[58] Field of Search ...................... 423/469; 62/12, 18; 23/294 R, 295 R

[56] References Cited

U.S. PATENT DOCUMENTS

| | | | |
|---|---|---|---|
| 2,717,235 | 9/1955 | Prober | 204/59 |
| 2,904,476 | 9/1959 | Man | 204/59 |
| 3,210,952 | 10/1965 | Strom | 62/12 |
| 3,345,277 | 10/1967 | Ashley et al. | 204/59 |
| 3,361,532 | 1/1968 | Massonne | 423/469 |
| 3,393,977 | 7/1968 | Langer | 423/469 |
| 3,675,392 | 7/1972 | Reighter | 55/75 |
| 3,992,159 | 11/1976 | Mitchell | 23/294 R |
| 4,039,646 | 8/1977 | Massonne | 423/469 |
| 4,274,851 | 6/1981 | Stokes | 62/12 |

FOREIGN PATENT DOCUMENTS

| | | | |
|---|---|---|---|
| 493556 | 6/1953 | Canada | 423/469 |
| 883673 | 12/1961 | United Kingdom | 423/469 |
| 932062 | 7/1963 | United Kingdom | |
| 1107363 | 3/1968 | United Kingdom | 423/469 |
| 1175774 | 12/1969 | United Kingdom | 423/469 |

OTHER PUBLICATIONS

Pfann, *Zone Melting*, John Wiley & Sons, NY, (1958), pp. 1-4, 20-27, 109-111.

Lykhmus, "The Cryogenic Growth of Crystals for Spectroscopic Studies", *Sov. Phys. Crystallog.*, vol. 20, No. 5, (1976), pp. 668-670.

*Primary Examiner*—Brian E. Hearn
*Attorney, Agent, or Firm*—Ladas & Parry

[57] ABSTRACT

The present invention relates to the production of high-purity substances and, more specifically, to a process for a fine purification of sulphur hexafluoride from impurities.

The process for a fine purification of sulphur hexafluoride comprises purification of sulphur hexafluoride by crystallization at a speed of displacement of the interphase boundary of from 1 to 50 mm/hr at a temperature of from 222.3 to 217° K.; the liquid-phase concentrate formed during crystallization is subjected to sublimation purification under a pressure of from 210 to 1.3–0.13 KPa.

The high-purity sulphur hexafluoride is useful in the high-voltage energetics as an insulation and arc-extinguishing medium, as well as in electronics, laser engineering, metallurgy and medicine.

6 Claims, 1 Drawing Figure

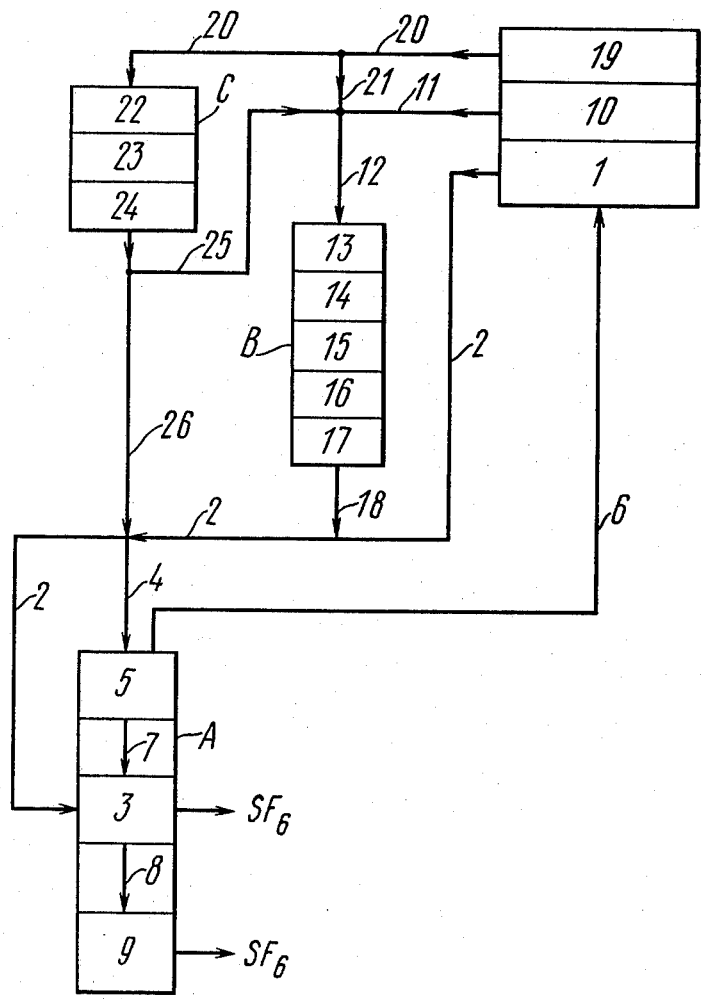

PROCESS FOR FINE PURIFICATION OF SULPHUR HEXAFLUORIDE FROM IMPURITIES

The present invention relates to the production of high-purity compounds and to a process for purfication of sulphur hexafluoride, more specifically, it relates to a process for fine purification of sulphur hexafluoride.

Sulphur hexafluoride is widely employed in high-voltage energetics as an insulating and arc-extinguishing agent; during recent years it has found an extensive use in electronics, laser engineering, medicine, X-ray engineering, metallurgy and other applications.

Sulphur hexafluoride employed in high-voltage instrumentation should meet the requirements as specified by the rated values approved for the content of impurities by the International Electrotechnical Comission (IEC). No. 376, 1971; these rated values are shown in the following Table 1.

TABLE 1

| Impurities in $SF_6$ | Maximum amount | Testing method |
| --- | --- | --- |
| $CF_4$ | 0.05% by mass | Chromatography |
| $N_2 + O_2$ | 0.05% by mass | Chromatography |
| $H_2O$ | 13 ppm | Gravimetry |
| Flourides as calculated for HF | 0.3 ppm | Titration |

However, $SF_6$ meeting the requirements of IEC No. 376 can incorporate a whole number of other impurities which do not affect the normal operation of high-voltage instrumentation but might cause detrimental effect on its use for other applications. Thus, in medicine and electronics the requirements as to the quality of $SF_6$ are substantially more severe, i.e. $SF_6$ should be subjected to a more comprehensive and fine purification; in other words, the level of concentration of the majority of contaminants should be within the range of from 1 to 100 ppm. No international specifications as to the quality of $SF_6$ for non-electrical applications are known hitherto.

The commercial production of $SF_6$ was started in the second half of the forties and by the present time a great number of patents teaching processes for the production and purification of sulphur hexafluoride have been accumulated. The major part of these patents are U.S. patents.

The earliest among these patents U.S. Pat. No. 2,462,379 should be singled. It teaches a process for purification of crude $SF_6$ containing, as impurities, at least one water-soluble acid and a lower sulphur fluoride-$S_2F_{10}$ which comprises first of all, washing of the crude gas with an aqueous solution of an alkali, then heating of the gas to a temperature above 250° C., followed by another washing of the gas with the aqueous alkali solution; the removal of the major portion of moisture from the gas is carried out after the secondary washing, whereafter the gas is passed through activated alumina to ensure a reliable elimination of moisture.

Despite the fact that this process ensures a reliable removal of active fluorides, low-boiling impurities such as $CF_4$, $N_2$ and $O_2$ still remain in the purified sulphur hexafluoride.

Another known process for the production of $SF_6$ comprises electrolysis of a covalent sulphur compound ($H_2S$, $CS_2$ or $SCl$) in the presence of anhydrous HF and solution of NaF at a voltage below the average of generation (recovery) of pure fluorine. The obtained $SF_6$ is condensed along with lower sulphur fluorides, whereafter it undergoes purification with a solution of KOH in a scrubber. The process ensures a reliable removal of active fluorides, though such impurities as $CS_2$ $N_2$ and $O_2$ still remain in the produce (cf. U.S. Pat. No. 2,717,235).

U.S. Pat. No. 2,883,267 teaches production of $SF_6$ from dehydrated $SF_4$ subjected to pyrolysis at a temperature above 500° C. The produce purification is effected by a low-temperature distillation. The process is simple, the product contains no $H_2O$, though it necessitates the use of expensive pyrolysis apparatus manufactured from platinum or "Hastelloy C" and does not ensure a complete elmination of such contaminants as $SOF_2$, $SF_4$.

U.S. Pat. No. 2,904,476 teaches electrolytical manufacture of $SF_6$ comprising electrolysis of a dehydrated mixture of $SF_4$ and HF at a temperature below 0° C., at a voltage of from 25 to 30 V and molar ratios between $SF_4$ and HF ranging from 1:2 to 10:1 respectively. The gas purification after separation of the excessive HF is effected by fractionation at lowered temperatures. Such impurities as $SOF_4$, $SIF_4$, $SOF_2$, $H_2$ and $CO_2$ are removed from the gas, but the process features substantial losses of HF and the use of low-temperature fractionation for the removal of the above-specified impurities is less effective for substantially any type of fractionation due to the presence of such impurities as HF, $CO_2$ and $SOF_2$ in the gas being purified.

The process for the production of sulphur hexafluoride as disclosed in U.S. Pat. No. 3,345,277 is carried out in an electrolyzer with a mixture of powder-like pure sulphur and dehydrated HF under voltage above the voltage of free fluorine generation. The obtained crude gas is passed through an adsorber to remove HF and subjected to purification by distillation. Despite the simple process equipment employed, the product is of a low purity and great losses of HF take place.

U.S. Pat. No. 3,361,532 teaches a process for the removal of $SO_2F_2$ from $SF_6$ by sorption in liquid or gas state on $Al_2O_3$ or solid oxides, hydroxides or carbonates of elements of Groups 1 and 2 of the periodic system. Only one impurity is removed in this process which is quite insufficient to obtain a pure product.

U.S. Pat. No. 3,393,977 teaches a process for the preparation of mixtures containing sulphur and fluorine such as $SO_2F_2$, $CSF_2$, $SF_4$, $SF_6$, $S_2F_{10}$, $SOF_2$, $CF_3SC$, $CF_3SCF_3$ and $CF_3SOF$, $(SiF_3)_2S$ which is carried out at elevated temperatures using mixtures of reagents of three types: fluorine-containing salts, inorganic deoxidizing agents and inorganic sulphur-containing salts. The process is performed at a temperature within the range of from 2,500° to 3,000° C. with evolution of gaseous reaction products which are then separated by low-temperature fractionation into low-boiling and high-boiling impurities. The process contemplates the use of starting materials with a low content of fluorine; however, it is necessary to employ sophisticated equipment and the product is obtained at increased production costs.

U.S. Pat. No. 3,675,392 teaches an adsorption-desorption process for purification of $SF_6$ comprising sorption of $SF_6$ from the mixture on a molecular sieve—zeolite $13\times$ under the pressure of 10 atm. The remaining impurities are vented through a valce into the atmosphere, $SF_6$ is desorbed upon heating and collected. This process does not ensure a high degree of purification; furthermore losses of $SF_6$ are rather great.

British Pat. Nos. 877,458; 883,673 and 932,062 teach processes for the production of $SF_6$ which feature complicated procedures, since in the reactors a combination of fluorine-containing compounds is obtained which is then separated in a chromatographic column preliminarily binding a portion of impurities by means of NaF, $BF_3$, $FeSO_4$, $H_2O$ and $CaSO_4$.

Though these process give a high-purity product, its cost is very high due to a low productivity of chromatographic columns.

French Pat. No. 2,261,222 teaches the production of $SF_6$, wherein elemental sulphur and fluorine are fed into a reactor for the synthesis of $SF_6$. Purification of $SF_6$ is effected by the scheme "catalysis-sorption-rectification" with recycle of the bottoms ot repeated fluorination. The process has advantages residing in that it is closed-circuit and only the desired product is obtained at the outlet of the scheme. However, the resulting product has but an insufficient quality.

Summarizing the relevant prior art review, it should be noted that each of the above-discussed processes contemplates purification of $SF_6$ from any particular one impurity and a group of impurities. Furthermore, the patents do not indicate the degree of purification, especially at the final stages, since analysis of fluorides is rather complicated technical problem.

The absence of a versatile process for a fine purification can be explained by that the amount of impurities determined by moder analytical methods such as mass-spectrometry is varied within the range of from 20 to 30 ppm and among these impurities there are such which have physical and chemical characteristics close to the product being purified.

Consequently, at the present time there is a need in a process for a fine purification of $SF_6$ which would be versatile in respect of the product purification from the majority of impurities at the same time.

It is an object of the present invention to provide such a process for a fine purification of $SF_6$ which would make it possible to simultaneously purify the product from the majority of impurities.

This object is accomplished by a process for a fine purification of $SF_6$, wherein according to the present invention the purification is effected by crystallization at a rate of displacement of the interphase boundary of from 1 to 50 mm/hr.

Advantages of the process according to the present invention reside in simultaneous elimination of substantially all impurities analyzed by the mass-spectrometry method, low power consumption at least by 4–5 times smaller than in the case of low-temperature rectification. The process makes it possible to achieve any desirable degree of purification.

According to the present invention, crystallization of $SF_6$ is carried out at a temperature of 222.3°–217° K.

A liquid-phase condensate containing substantial amounts of $SF_6$ is formed in the crystallization. The recovery of $SF_6$ from the concentrate can be effected both by a repeated crystallization and a sublimation purification under a pressure of from 210 Pa to 1.3–0.13 kPa. However, the sublimation purification requires substantially lower power consumption, wherefore it is economically more effective.

In the case where sulphur hexafluoride to be purified contains an increased amount of low-boiling impurities such as $N_2$, $O_2$ and $CF_4$, prior to crystallization it is advisable to carry out distillation with evacuation of the vapours enriched with low-boiling impurities in an amount of from 0.2 to 5% by mass of the starting raw materials. This operation requires minimal power consumption.

In the case of purification of $SF_6$ containing, as impurities, lower sulphur fluorides and HF which are strong toxic and corrosion-active agents, it is desirable that $SF_6$ be preliminary subjected to sorption-catalytic purification, namely sorption on KOH, then catalytic treatment at a temperature of from 548° to 598° K., repeated sorption on KOH, sorption on $Al_2O_3$ and drying on zeoplites of NaX type.

These stages facilitate further operations of crystallization, distillation and sublimation in apparatus made from inexpensive structural materials and ensure safe labour conditions for the operating personnel.

In accordance with the present invention, purified can be $SF_6$ which has already been used in high-voltage gas-filled apparatus. To this end, a portion of gaseous $SF_6$ present in the apparatus under an overatmospheric pressure is delivered to a sorption-catalytic purification as described hereinabove, i.e. sorption on KOH, catalysts, repeated sorption on KOH, sorption of alumina and drying on zeolites of the NaX type. Afterwards, the gas is delivered to crystallization at the above-indicated speed of movement of the interphase boundary.

The other portion of gaseous $SF_6$ remaining in the high-voltage apparatus under a pressure below atmospheric is passed through an aqueous alkali solution, dried on $Al_2O_3$ and NaX zeolites and further treatment is effected according to any of the conventional methods described hereinabove. This makes it possible to fully regenerate the gas from the high-voltage apparatus for a repeated use and to eliminate its losses.

The process for a fine purification of $SF_6$ according to the present invention can be performed in several embodiments depending on the composition of impurities in the gas being purified and the requirements imposed on the purified product, as well as on the type of $SF_6$ to be purified.

As the starting stock the following kinds of $SF_6$ can be used:

$SF_6$ recovered from high-voltage gas-filled apparatus for regeneration with the view to a repeated use thereof as a dielectric and an arc-extinction medium. The impurities can incorporate lower sulphur fluorides, carbofluorides, $SO_2$, HF and $SOF_2$, as well as other impurities in an amount ranging from 0.5 to 5% by mass;

$SF_6$ obtained from the reactor after synthesis as a crude gas containing, as impurities, lower sulphur fluorides, carbofluorides, HF, $CS_2$, $SOF_4$ and other impurities in an amount ranging from 0.5 to 15% by mass;

$SF_6$ containing no substantial amounts of lower fluorides and other toxic substances in the impurities, the total amount of the impurities being within the range of from 0.5 to 5% by mass.

The sulphur hexafluoride purified by the process according to the present invention can be used in high voltage energetics, since it meets the requirements of IEC No. 376 norms. Furthermore, by the process according to the present invention it is possible to obtain the product of a higher quality as regards the composition of impurities controlled by the mass-spectrometry method. Given hereinbelow is a detailed description of the process for purification of $SF_6$ with reference to the accompanying drawing showing the principal flow-sheet of the process which allows several embodiments.

In accordance with the process flow-sheet shown in the drawing, purification of sulphur hexafluoride is effected in various combination in three blocks:

"A"—mass-transfer block;
"B"—sorption-catalysis block;
"C"—preliminary purification block.

The mass-transfer block A is intended for purification of $SF_6$ containing no substantial amounts of toxic and corrosion-active contaminants such as lower sulphur fluorides, $CS_2$, $SiF_4$, HF in the whole group of impurities. Sulphur hexafluoride passing into this block "A" can be first purified by distillation if it contains an increased amount of such low-boiling impurities as $N_2$, $O_2CF_4$ (for example 1-2% by volume). The vapour is removed from the top (stripping) section of the column in an amount of from 0.2 to 5% by mass of the starting feedstock.

The subsequent crystallization with a speed of displacement of the interphase boundary of from 1 to 50 mm/hr makes it possible to obtain $SF_6$ of substantially any degree of purification by repeating the process. The liquid-phase concentrate of impurities obtained from the crystallization can be supplied to repurification or subjected to a sublimation purification from low-boiling impurities by reduction of pressure from 210 to 1.3-0.13 kPa. The sublimation purification of the liquid-phase concentrate is more preferable, since it necessitates lesser power consumption.

For a fine purification of sulphur hexafluoride containing, as impurities, the above-mentioned lower sulphur fluorides and other toxic impurities, it is preliminary purified in the sorption-catalysis block "B", whereafter it is supplied for purification into the mass-transfer block "A".

Successively passing through purification stages first on KOH, then in a catalytical column at a temperature of from 548° to 598° K., again on KOH and in adsorbers with $Al_2O_3$ and zeolites NaX, sulphur hexafluoride is purified from dangerous impurities which in the mass-transfer block "A" can be the cause of the corrosion breakdown of the equipment or be harmful for the operating personnel. As the catalyst use can be made of a chromium-nickel stainless steel, type 18-8.

Purification of sulphur hexafluoride after its use in high-voltage apparatus can be effected in the circuit of sorption-catalysis purification in block "B", whereinto it is fed under an overatmospheric pressure, and then in the circuit of mass-transfer removal of the residual impurities in block "A"; otherwise, under a subatmospheric pressure sulphur hexafluoride is first fed into block "C" for a preliminary purification, wherein it is treated with an aqueous alkali solution, e.g. KOH with a concentration of from 1 to 40%, then dried on $Al_2O_3$ and zeolites NaX, followed by addmission thereof into block A.

After the preliminary purification $SF_6$ can be delivered either directly into the mass-exchange block "A" or into a sorption-catalytic block "B" for a more complete removal of impurities.

In any embodiment of purification of $SF_6$ the sequence of passing through the purification blocks "A", "B" and "C" is determined by the composition of impurities in the raw material and quality of the obtained product. For this reason, the detailed description of the following embodiments of the purification process according to the present invention is given hereinbelow.

EMBODIMENT 1

Sulphur hexafluoride after the synthesis, preliminarily exempted from toxic impurities is delivered from a vessel 1 via a line 2 into a block "A", apparatus 3, wherein crystallization occurs at a speed of displacement of the interphase boundary of from 1 to 50 mm/hr. The crystallization process is conducted at a temperature of 222.3° to 217° K. The pressure corresponds to that of the ternary point. In doing so, from the purified $SF_6$ substantially all impurities are passed into the liquid-phase concentrate with the efficiency inversely proportional to the speed of displacement of the interphase boundary. The thus-purified sulphur hexafluoride is a commercial product and can be used in electronics and medicine. The advantage of the crystallization, as compared to other mass-transfer methods based on the phase transition, resides in a low rate of power consumption and versatility of the purification in respect of substantially all impurities in sulphur hexafluoride.

Furthermore, crystallization of sulphur hexafluoride in the repeated cycle of the process makes it possible to obtain the gas of substantially any degree of purification for all impurities. The productivity of crystallization can be sufficient for a commercial large-scale production and can be attained on a standard and simple equipment.

EMBODIMENT 2

Sulphur hexafluoride after synthesis, preliminarily purified from toxic impurities, but with an increased content of low-boiling impurities ($N_2$, $O_2$, $CF_4$) from vessel 1 via lines 2 and 4 is passed into a block "A", apparatus 5, wherein distillation is effected at a lowered temperature, though not below than 222° K. The vapour is withdrawn in an amount of from 0.2 to 5% and then via a line 6 is fed into the vessel 1. From the apparatus 5 the liquified $SF_6$ is delivered, via a line 7, into the apparatus 3, wherein crystallization is effected as described in Embodiment 1. The resulting purified product is withdrawn from the apparatus 3 for its use by the customer, while the remaining liquid-phase concentrate is delivered via a line 8 into an apparatus 9, wherein it is subjected to a sublimation purification under a pressure of from 210 to 1.3-0.13 kPa.

The product obtained in the apparatus 9 fully meets the requirements of IEC norms regarding the composition of impurities and can be used for electroengineering purposes.

Carrying out the distillation prior to the crystallization ensures a more effective separation of impurities substantially without consumption of power, since $SF_6$ should be subjected to cooling for crystallization. The sublimation purification of the liquid-phase concentrate also requires low rates of power consumption and enables rather simple manufacture of the commercial product. The repeated crystallization for the liquid-phase concentration of impurities is less efficient from the energetic standpoint.

EMBODIMENT 3

Sulphur hexafluoride after synthesis, containing as impurities toxic lower fluorides and HF is delivered from the vessel 10 via lines 11 and 12 to the sorption-catalytic purification in block "B", successively into apparatus 13, 14, 15, 16 and 17. In the apparatus 13 such impurities as $SF_4$ and HF are sorbed on KOH. In the apparatus 14 at a temperature of from 548° to 598° K.

there is a catalytical decomposition of the impurity $S_2F_{10}$ into $SF_4$ and $SF_6$, as well as heavy fluorides $C_nF_{2n+2}$ to $CF_4$. As the catalyst in apparatus 14 use is made of a chromium-nickel stainless steel, type 18-8.

In the adsorber 15 on KOH there are sorbed $SF_4$ formed in the apparatus 14 and partially $SO_2$. In the apparatus 16 $H_2O$, $SO_2F_2$ and partially $SO_2$ are sorbed on $Al_2O_3$. In the apparatus 17 on zeolites 13× deep drying of the gas is effected.

Then the gas is fed via the lines 18, 2 and 4 into block "A" and then the purification is conducted according to Embodiment 1 or Embodiment 2. The use, in block "B" of the purification scheme "sorption-catalysis-sorption-deep drying" is necessary for a reliable elimination of toxical impurities from $SF_6$, decomposition of heavy carbofluorides to $CF_4$ and sorption of moisture which in the subsequent mass-transfer operations is difficult to remove due to hydrate-formation thereof with such impurities as $CF_4$, $SO_2$ and $SF_6$ per se. The advantage of the scheme according to this Embodiment 3 of the present invention is simple design of the process equipment and absence of toxical gaseous waste products.

EMBODIMENT 4

The present embodiment discloses purification of sulphur hexafluoride which has been used in high-voltage gas-filled apparatus and contaminated with toxic products of decomposition of $SF_6$ in a high-voltage discharge. In this case the purification unit comprising blocks "A", "B" and "C" is connected directly to the high-voltage gas-filled apparatus 1a.

Sulphur hexafluoride from apparatus 19 under an over-atmospheric pressure is delivered via lines 20, 21 and 12 into block "B", wherein it is purified according to Embodiment 3. The remaining portion of the gas $SF_6$ from the high-voltage apparatus 19 under subatmospheric pressure is fed, via line 20, into block "C", apparatus 22, wherein it undergoes washing with an aqueous solution of KOH with a concentration of from 1 to 40%. In the apparatus 22 the hydrolyzable impurities such as HF, $SF_4$ and others are removed. Then the gas is fed into an adsorber 23 containing $Al_2O_3$ for a preliminary drying and removal of the impurity of $SO_2F_2$. The final drying of $SF_6$ is effected in an adsorber 24 by means of zeolites NaX. The use of block "C" for regeneration of $SF_6$ from high-voltage apparatus makes it possible to solve the problem of a full conservation of an expensive gas in the case of inspection of a high-voltage gas-filled equipment without contamination of $SF_6$ with oil in rotary or other vacuum-pumps and avoid corrosion-resistance of valve means. These advantages are especially important taking into account the fact that $SF_6$ well dissolves the majority of known oils and can be purified therefrom with substantial difficulties. The presence of oils in $SF_6$ is regulated by Norms IEC No. 376 at 10 ppm.

From block "C" sulphur hexafluoride via lines 25 and 12 is delivered to purification in block "B" and then to the circuit according to Embodiment 3. In this case the fullest purification is effected, including purification from carbofluorides of the type $C_nF_{2n+2}$.

If the presence of these impurities is not rated, the gas from block "C" can be delivered via the line 26 to block "A".

For a better understanding of the present invention, some specific examples are given hereinbelow with reference to the accompanying drawings.

EXAMPLE 1

Purification of $SF_6$ containing no toxic impurities

The starting crude material contains mainly such impurities as $O_2$, $CS_2$, $SO_2$ and $H_2O$.

The gas is subjected to purification according to Embodiment 1. Variation of the concentration of the basic impurities during purification at different speeds of displacement of the interphase boundary during crystallization is shown in Table 2, wherein $V_{cr}$ is rate of crystallization and $T_{cr}$—crystallization temperature.

TABLE 2

| State of $SF_6$ | Impurities in $SF_6$ | | | | | | $H_2O$ ppm |
|---|---|---|---|---|---|---|---|
| | $N_2$ | $O_2$ | $CF_4$ | $SOF_2$ | $CS_2$ | $SO_2$ | |
| | Concentration in vol. % | | | | | | |
| Gas after purification | | | | | | | |
| Starting gas before purification | 0.1 | 0.02 | 0.14 | 0.05 | 0.02 | 0.04 | 22 |
| $V_{cr}$ = 1 mm/hr $T_{cr}$ = 217° K. | 0.001 | 0.0005 | 0.01 | 0.005 | 0.005 | 0.005 | 2 |
| $V_{cr}$ = 8 mm/hr $T_{cr}$ = 220° K. | 0.001 | 0.0005 | 0.03 | 0.015 | 0.007 | 0.01 | 4 |
| $V_{cr}$ = 50 mm/hr $T_{cr}$ = 222° K. | 0.002 | 0.0005 | 0.045 | 0.024 | 0.01 | 0.02 | 5 |

EXAMPLE 2

Purification of $SF_6$ containing no toxic impurities but having an increased content of low-boiling impurities The starting crude material contains low-boiling impurities $N_2$, $CF_4$, $SOF_2$, as well as $O_2$, $CS_2$, $SO_2$ and $H_2O$. The gas is subjected to purification according to Embodiment 2.

Variation of concentration of the basic impurities after purification by distillation at withdrawal of 3% of the vapour based on the raw material mass, as well as after sublimation purification of the liquid-phase concentrate formed during crystallization at $V_{cr}$=8 mm/hr is shown in Table 3.

TABLE 3

| Stages of purification | Impurities in $SF_6$ | | | | | | $H_2O$ ppm |
|---|---|---|---|---|---|---|---|
| | $N_2$ | $O_2$ | $CF_4$ | $SOF_2$ | $CS_2$ | $SO_2$ | |
| | Concentration in percent by volume | | | | | | |
| Initial gas | 1.5 | 0.2 | 0.5 | 0.05 | 0.02 | 0.04 | 38 |
| $SF_6$ after distillation (apparatus 5) | 0.1 | 0.02 | 0.14 | 0.05 | 0.02 | 0.04 | 20 |
| After crystallization $V_{cr}$ = 8 mm/hr $T_{cr}$ = 220° K. (apparatus 3) | 0.001 | 0.0005 | 0.03 | 0.015 | 0.01 | 0.02 | 5 |
| $SF_6$ after sublimation purification (apparatus 9) | 0.01 | 0.001 | 0.05 | 0.06 | 0.025 | 0.04 | 5 |

EXAMPLE 3

Purification of $SF_6$ containing toxic impurities

The starting material after the synthesis contains strongly toxic fluorides such as $S_2F_{10}$, HF, $F_2O$, $SF_4$ in concentrations ranging from 0.01 to 1%, as well as $CO_2$, Ar, $CS_2$, $SO_2$, $N_2$, $O_2$, $SOF_2$, $SO_2F_2$, $SOF_4$, $C_nF_{2n+2}$. Concentration of $N_2$ and $C_nF_{2n+2}$ is up to 5% by volume for each, while the content of other impurities is not high and varies within the range of from 0.05 to 0.5% by volume for each of the impurities.

The gas is subjected to purification according to Embodiment 3.

Variation of concentrations of most characteristic impurities is shown in Table 4.

TABLE 4

| Stages of purification | Impurities in $SF_6$ | | | | | | | |
|---|---|---|---|---|---|---|---|---|
| | $F_2O$ | $SF_4$ | $S_2F_{10}$ | $CF_4$ | $C_5F_{10}$ | $SO_2$ | $N_2 + O_2$ | $H_2O$ |
| | Concentration in percent by volume | | | | | | | ppm |
| The starting gas (apparatus 10) | 0.3 | 0.3 | 0.05 | 0.2 | 0.5 | 0.05 | 0.8 | 1,500 |
| Adsorber with KOH (apparatus 13) | 0.03 | 0.02 | 0.05 | 0.2 | 0.5 | 0.03 | 0.8 | 500 |
| Catalyst (apparatus 14) | 0.03 | 0.15 | 0.001 | 0.8 | 0.03 | 0.08 | 0.8 | 500 |
| Adsorber with KOH (apparatus 15) | 0.01 | 0.02 | 0.001 | 0.8 | 0.03 | 0.03 | 0.8 | 150 |
| Adsorber with $Al_2O_3$ (apparatus 16) | 0.003 | 0.005 | 0.0005 | 0.75 | 0.025 | 0.02 | 0.75 | 25 |
| Adsorber with NaX (apparatus 17) | 0.001 | 0.002 | 0.0001 | 0.7 | 0.020 | 0.02 | 0.75 | 5 |
| Crystall (apparatus 3) $V_{cr} = 30$ mm/hr | 0.0001 | 0.0002 | 0.0001 | 0.003 | 0.001 | 0.001 | 0.002 | 2 |

After the adsorbed with zeolites NaX (apparatus 17) the gas is fed to the fine purification into block "A" according to Embodiment 1 or Embodiment 2. Pressure of adsorption is 0.4 MPa.

EXAMPLE 4

Purification of $SF_6$ after use thereof in high-voltage gas-filled apparatus

The starting material from a high-voltage apparatus 19 is fed via lines 20, 21, 12 into block "B" and then to the fine purification into block "A" as described in the foregoing Example 4.

When the pressure in the apparatus 19 is made equal to about 1 atm.abs. the starting material is fed via line 20 into block "C", wherein successively in apparatus 22, 23 and 24 the gas is washed with an aqueous solution of an alkali (KOH with a concentration ranging from 1 to 40%), drying in adsorber 23 with $Al_2O_3$ and fine drying on zeolites NaX in the adsorber 24. The final purification of $SF_6$ can be effected either according to Embodiment 3 via line 25, or according to Embodiment 1 or 2 using lines 26 and 2 or 26 and 4.

The variation of concentration of the impurities as the product is passing through the apparatus of block "C" is shown in Table 5 hereinbelow.

TABLE 5

| | Impurities in $SF_6$ | | | | | | |
|---|---|---|---|---|---|---|---|
| | $SF_4$ | $SO_2$ | $SOF_2$ | $SO_2F_2$ | $CF_4$ | $N_2 + O_2$ | $H_2O$ |
| | Concentration in percent by volume | | | | | | ppm |
| 1 | 2 | 3 | 4 | 5 | 6 | 7 | 8 |
| Initial gas (apparatus 19) | 0.2 | 0.8 | 0.1 | 0.3 | 0.2 | 0.25 | 200 |
| 10% KOH solution (apparatus 22) | 0.02 | 0.1 | 0.1 | 0.25 | 0.2 | 0.25 | 500 |
| Adsorber with $Al_2O_3$ (apparatus 23) | 0.01 | 0.07 | 0.08 | 0.025 | 0.2 | 0.25 | 50 |
| Adsorber with NaX (apparatus 24) Embodiment 2 | 0.05 | 0.07 | 0.08 | 0.010 | 0.2 | 0.25 | 5 |
| sublimation (apparatus 9) Final pressure $P_{fin} = 13$ KPa | 0.0002 | 0.02 | 0.05 | 0.005 | 0.05 | 0.06 | 5 |

What is claimed is:

1. A process for a fine purification of sulphur hexafluoride from impurities comprising purification of sulphur hexafluoride by crystallization at a speed of displacement of the interphase boundary of from 1 to 50 mm/hr.

2. A process according to claim 1, wherein crystallization is carried out at a temperature of 222.3°–217° K.

3. A process according to claim 1, wherein the liquid-phase concentrate of impurities formed during crystallization is solidified and subjected to a sublimation purification under a pressure of from 210 to 1.3–0.13 KPa.

4. A process according to claim 1, wherein subjected to crystallization is sulphur hexafluoride preliminary purified, by distillation, from low-boiling impurities with discharging vapours in an amount of from 0.2 to 5% by mass of the starting product.

5. A process according to claim 1, wherein for the purification of sulphur hexafluoride containing, as impurities, lower sulphur fluorides and HF, the gas is preliminary purified by sorption on KOH, a portion of impurities is subjected to a catalytical decomposition at a temperature of from 548° to 598° K., a repeated sorption on KOH, sorption on $Al_2O_3$ and drying on zeolites of NaX type.

6. A process according to claim 1 wherein the sulphur hexafluoride being purified is obtained from a high-voltage gas filled apparatus and as a preliminary step in the purification one portion of the sulphur hexafluoride is subjected to distillation to separate low-boiling impurities amounting to 0.2 to 5% by mass of the starting material and the other portion under subatmospheric pressure is passed through an aqueous solution of an alkali followed by drying on alumina and zeolites of the NaX type.

* * * * *